United States Patent
Lee et al.

(10) Patent No.: US 7,822,804 B2
(45) Date of Patent: Oct. 26, 2010

(54) METHOD FOR PROVIDING PERSONALIZATION SERVICE IN UBIQUITOUS ENVIRONMENT AND INTELLIGENT GADGET THEREOF

(75) Inventors: Kwang-Hee Lee, Daejon (KR); Kyoung-Ju Noh, Daejon (KR); Chang-Seok Bae, Daejon (KR); Jong-Ho Won, Daejon (KR); Dong-Won Han, Daejon (KR); Hye-Ju Jang, Daejon (KR); Eun-Jeong Choi, Daejon (KR); Dong-Wan Ryoo, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 284 days.

(21) Appl. No.: 11/950,793

(22) Filed: Dec. 5, 2007

(65) Prior Publication Data

US 2008/0140775 A1 Jun. 12, 2008

(30) Foreign Application Priority Data

Dec. 7, 2006 (KR) ...................... 10-2006-0124029

(51) Int. Cl.
*G06F 15/16* (2006.01)
*G06F 15/177* (2006.01)
*G06F 15/173* (2006.01)

(52) U.S. Cl. ...................... 709/202; 709/218; 709/220; 709/223; 709/249

(58) Field of Classification Search ........................ None
See application file for complete search history.

(56) References Cited

U.S. PATENT DOCUMENTS

| 6,314,091 | B1* | 11/2001 | LaRowe et al. | 370/338 |
| 6,757,719 | B1* | 6/2004 | Lightman et al. | 709/219 |
| 7,558,622 | B2* | 7/2009 | Tran | 600/509 |
| 2005/0088980 | A1* | 4/2005 | Olkkonen et al. | 370/255 |
| 2005/0136958 | A1* | 6/2005 | Seshadri et al. | 455/519 |
| 2006/0193308 | A1* | 8/2006 | Sung | 370/352 |
| 2006/0271695 | A1* | 11/2006 | Lavian | 709/229 |
| 2007/0200914 | A1* | 8/2007 | DuMas et al. | 348/14.01 |
| 2008/0001735 | A1* | 1/2008 | Tran | 340/539.22 |

FOREIGN PATENT DOCUMENTS

| JP | 7-200233 A | 4/1995 |
| KR | 101998037019 | 8/1998 |
| KR | 1019980076374 A | 11/1999 |
| KR | 1020040080663 | 9/2004 |
| KR | 1020050090473 | 9/2005 |
| KR | 1020060034074 | 4/2006 |
| KR | 1020060087883 A | 8/2006 |
| KR | 1020060102051 | 9/2006 |
| KR | 1020000037635 A | 7/2007 |

* cited by examiner

*Primary Examiner*—John B. Walsh
(74) *Attorney, Agent, or Firm*—Ladas & Parry LLP (57) ABSTRACT

Provided is a method for providing a personalization service in a ubiquitous environment and an intelligent gadget thereof. The intelligent gadget includes: a gadget service block for collecting and processing data to provide a personalization service; and a gadget interface block for forming a gadget network between gadgets and providing a cooperating service based on the collected and processed data.

13 Claims, 6 Drawing Sheets

METHOD FOR PROVIDING PERSONALIZATION SERVICE IN UBIQUITOUS ENVIRONMENT AND INTELLIGENT GADGET THEREOF

CROSS-REFERENCE(S) TO RELATED APPLICATIONS

The present invention claims priority of Korean Patent Application No. 10-2006-0124029, filed on Dec. 7, 2006, which is incorporated herein by reference.

BACKGROUND OF THE INVENTION

1. Field of the Invention

The present invention relates to a method for providing a personalization service in a ubiquitous environment and an intelligent gadget thereof; and, more particularly, to a method for providing a personalization service in a ubiquitous environment which forms a gadget network actively changed by a gadget and provides the personalization service through interaction between gadgets, and an intelligent gadget thereof.

This work was supported by the IT R&D program for MIC/IITA [2006-S-032-01, "Development of an Intelligent Service Technology based on the Personal Life Log"].

2. Description of Related Art

Recently, an information processing technology and an information processing device have been remarkably developed. An information process based service is diversely applied to a daily life based on the information processing technology and the information processing device. The information process based service has a target of realizing a ubiquitous environment for providing a seamless service. Also, many researches for providing a customized service have been progressed.

In the conventional researches described above, each device on a network is expressed as a descriptor and a research on a service recreation required by a user by applying the descriptor has been progressed. The research is limited to rebuild a service applying a device descriptor by interruption of the user in a static network environment.

Also, conventional researches include a research related to a procedure that a device in a personal network region determines handoff with an enterprise network. In the conventional researches, the device in the enterprise network personal network region becomes a part of the enterprise network in handoff. Since the device in the enterprise network personal network region becomes the part of the enterprise network, the conventional researches have a difficulty in maintaining a security.

The conventional researches also include a research on a set-up procedure between two devices for data exchange between mobile devices in a personal network region and a research on a procedure that a device network is included in a personal region network or disconnected.

The many conventional researches related to cooperation with the personal region network and an external network, and creation and performance of services according to active network change need to be continuously progressed.

SUMMARY OF THE INVENTION

An embodiment of the present invention is directed to providing a method for providing a personalization service in a ubiquitous environment which forms a gadget network actively changed by a gadget and provides the personalization service through interaction between gadgets, and an intelligent gadget thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an intelligent gadget for providing a personalization service in a ubiquitous environment, including: a gadget service block for collecting and processing data to provide a personalization service; and a gadget interface block for forming a gadget network between gadgets and providing a cooperating service based on the collected and processed data.

In accordance with another aspect of the present invention, there is provided a method for providing a personalization service by a gadget in a ubiquitous environment, including the steps of: a) when a gadget network is formed based on gadget identification (ID) and network ID of neighboring gadgets, starting own gadget service, exchanging gadget service control information with the neighboring gadgets, and loading a gadget network based-service; b) creating a new gadget network based-service based on the gadget service control information exchanged with the neighboring gadgets; c) forming a logical gadget network including only gadgets attending performance of the gadget network based-service when the created gadget network based-service is created; and d) performing a gadget network based-service through interaction of gadgets based on the logical gadget network.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
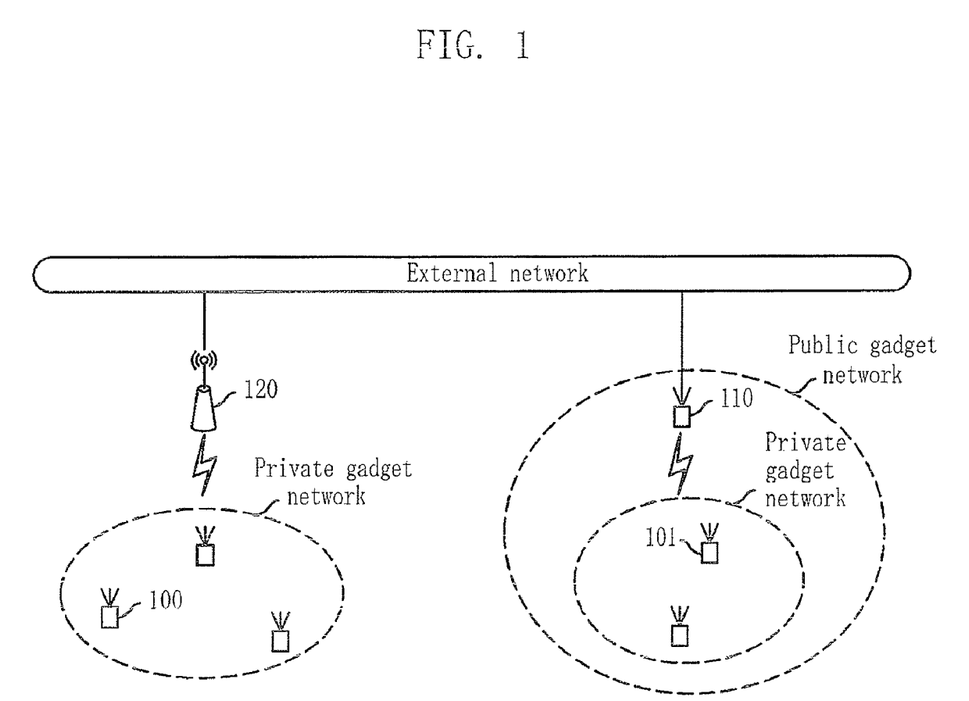
FIG. 1 shows an intelligent gadget network to which the present invention is applied.

FIG. 1 shows an intelligent gadget network to which the present invention is applied.

Referring to FIG. 1, the intelligent gadget network, which is called a gadget network hereinafter, is divided into a private gadget network only including private gadgets 100 and 101, and a public gadget network including a public gadget 110 which is not included in the private gadget network. In particular, a specific private gadget 101 may be simultaneously overlaid in the private gadget network and the public gadget network.

Since a gadget network is designated to the private gadgets 100 and 101 in advance, but is not designated to the public gadget 110, the public gadget 110 may be included in any gadget network.

The gadget network cooperates with an external network. Since the gadget network is not exposed to the external network, it is easy to maintain a security in the gadget network.

When the specific private gadget 100 in a private gadget network has communication media capable of cooperating with a communication access point 120 in the external network, the specific private gadget 100 becomes a gateway gadget providing a function for cooperating with the external network in other private gadgets within the private gadget network. Accordingly, the private gadget network can cooperate with the external network. When the specific private gadget 101 within the private gadget network does not have the communication media capable of cooperating with the external network, the specific private gadget 101 cooperates with the external network through the public gadget 110 providing a gateway function.

As described above, the gadget network is divided into the private gadget network and the public gadget network and managed. Since the private gadget network cooperates with the external network through a gadget functioning as a gateway inside, or cooperates with the outside through the public gadget, it is easy to extend a network.

In addition, a person owes and moves the private gadget and the public gadget is fixed in a near place. The private gadget and the public gadget have a logic providing a communication interface and a communication protocol, and are included in an active gadget network according to configuration information of a perimeter gadget, which is a situation of recognizing each other and actively changing. Accordingly, the private gadget and the public gadget cooperate based on the exchanged gadget service control information and provides a personalization service to the user. Also, the private gadget and the public gadget can widely provide a proper service to the user according to own situation.

According to the above procedure, the private gadget and the public gadget may be a subject providing a specific service, or an object inactively receiving the specific service.

Figure 2:
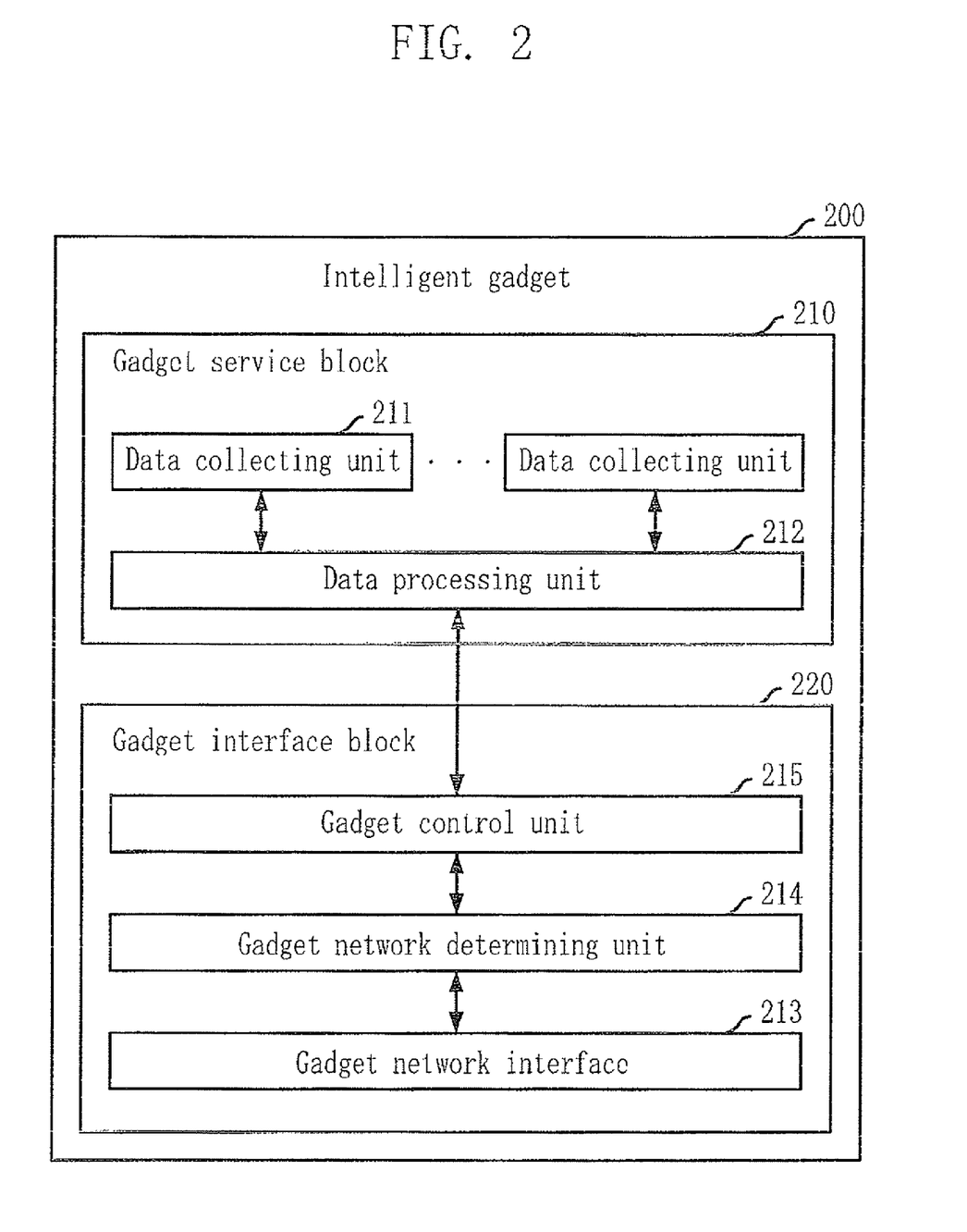
FIG. 2 is a block diagram showing an intelligent gadget for providing a personalization service in a ubiquitous environment in accordance with an embodiment of the present invention.

FIG. 2 is a block diagram showing an intelligent gadget for providing a personalization service in a ubiquitous environment in accordance with an embodiment of the present invention.

Referring to FIG. 2, the intelligent gadget for providing the personalization service in the ubiquitous environment, which is called a gadget 200 hereinafter, builds a ubiquitous environment and easily provides a ceaseless personalization service through the built ubiquitous environment.

The gadget 200 includes a gadget service block 210 and a gadget interface block 220. The gadget service block 210 provides a unique personalization service function, which is called a gadget service hereinafter. The gadget interface block 220 provides a service provided by forming of a gadget network between gadgets and cooperating of the gadgets. In particular, the gadget interface block 220 includes a communication protocol logic for a communication function between gadgets, a service management function based on a gadget network, and a service performance function.

The gadget service block 210 includes a data collecting unit 211 and a data processing unit 212. To be specific, the data collecting unit 211 may be more than one in the gadget service block 210 and collects specific data by using a sensor, an actuator, a camera, and Global Positioning System (GPS). The data processing unit 212 cooperates with the data collecting unit 211, and manufactures and processes data in a predetermined format. That is, the gadget service block 210 can provide more than one gadget service to the user.

Also, the gadget interface block 220 includes a gadget network interface 213, a gadget network determining unit 214, and a gadget control unit 215. To be specific, the gadget network interface 213 provides a communication function for forming a gadget network. For example, the gadget network interface 213 mutually recognizes a neighboring gadget member according to a wireless personal area network (WPAN). The gadget network interface 213 executes a general function which determines an optimal communication environment with the gadget network members.

The gadget network determining unit 214 determines and controls a gadget network configuration according to an actively changing gadget member. That is, the gadget network determining unit 214 manages own gadget identification (ID) and a network ID of a gadget network, e.g., WPAN ID.

The gadget network determining unit 214 determines whether a gadget is a private gadget or a public gadget based on the network ID of the neighboring gadget member. When the gadget network to be included in the network ID is designated, the gadget is determined as the private gadget. When the gadget network to be included in the network ID is not designated, the gadget is determined as the public gadget. Also, the gadget network determining unit 214 is included in a private gadget network having a private gadget authenticated according to a pre-determined authentication procedure as a member based on the gadget ID of the neighboring gadget member. Since the gadget network determining unit 214 is included in a public gadget network according to the same method as described above, detailed description will not be provided herein.

The gadget control unit 215 exchanges and processes gadget service information and gadget service control information, i.e., Application Programming Interface information, between members of the gadget network determined by the gadget network determining unit 214. That is, when the gadget network is completely formed, the gadget control unit 215 performs publishing, inquiring and responding on the gadget service control information such that other gadget network members can control the gadget service information and gadget service provided by the gadget control unit 215 between the gadget network members. In order wards, the gadget control unit 215 can provide a gadget network based-service created by controlling the gadget service provided by another gadget network member to the user.

The gadget control unit 215 can control the gadget service provided by the neighboring gadget network member based on the gadget service information and the gadget service control information of the gadget member. That is, the gadget control unit 215 provides the gadget network based-service created by interacting with the gadget network member to the user based on the gadget service control information of more than one gadget network member.

According to user request, the gadget control unit 215 provides the gadget network based-service created by interacting with the gadget network member to the user based on the gadget service control information of pre-formed gadget network members. Also, when the gadget control unit 215 has an awareness function of specific contexts such as currently provided gadget service control information, a performing service, requested gadget service control information, and user's taste, the gadget control unit 215 creates and performs the gadget network based-service according to the specific context based on the gadget service control information exchanged between the gadget network members. Also, the gadget control unit 215 attends the pre-formed gadget network. However, when the gadget network member does not request the gadget service control information, the gadget control unit 215 performs the gadget service, which is a unique function of the gadget control unit 215.

While the gadget interface block 220 exchanges the gadget service control information with the gadget network members and performs the gadget network based-service, the gadget interface block 220 is included in a logical gadget network to be described below with the gadgets attending the specific gadget network based-service determined based on the gadget service control information.

Figure 3:
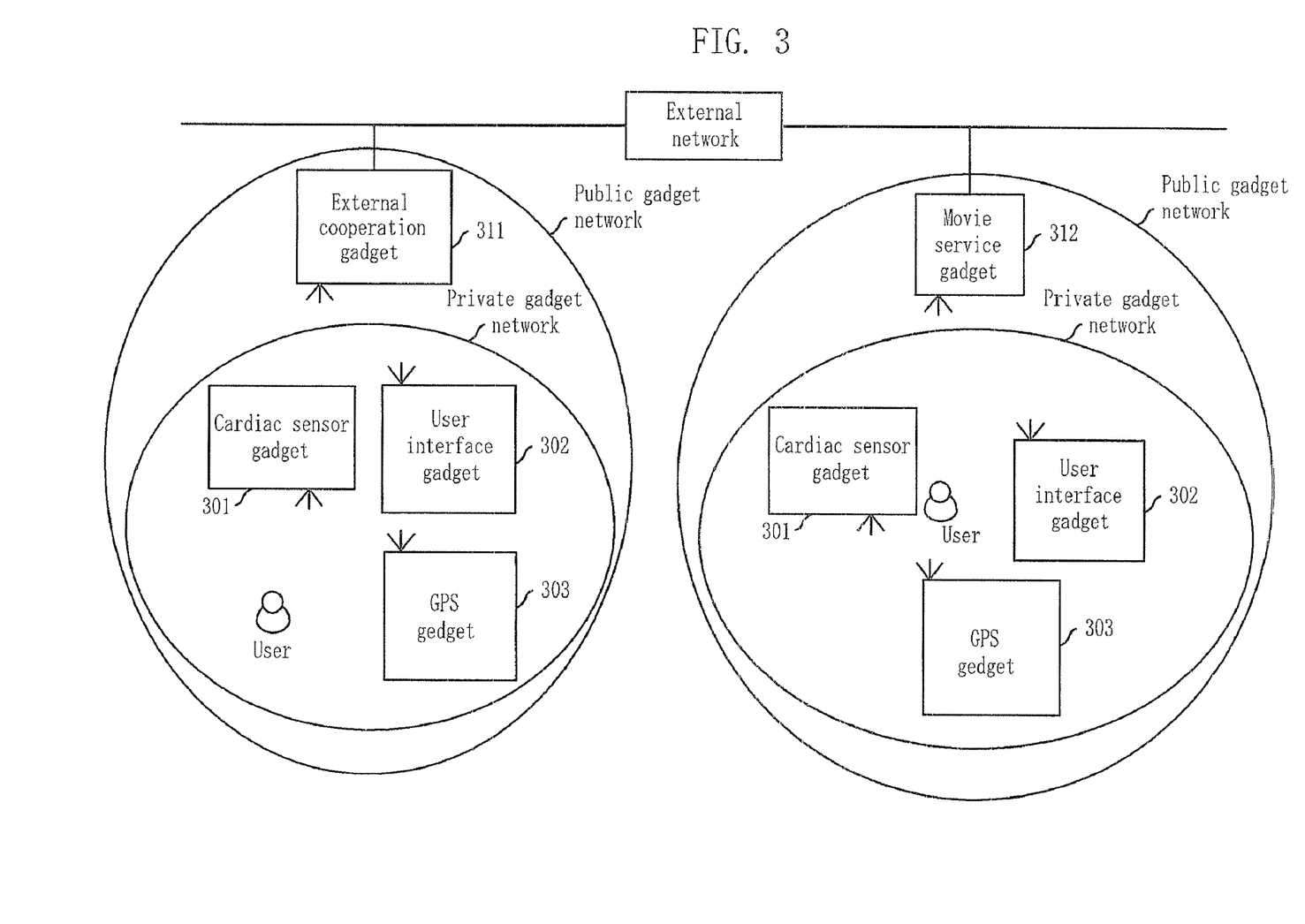
FIG. 3 shows an intelligent gadget network to which the present invention is applied.

FIG. 3 shows an intelligent gadget network to which the present invention is applied.

Referring to FIG. 3, the intelligent gadget network includes a private gadget network and a public gadget network. The private gadget network includes private gadgets such as a cardiac sensor gadget 301, a user interface gadget 302, and a GPS gadget 303 and performs the gadget network based-service. The public gadget network actively cooperates with the public gadgets such as an external cooperation gadget 311 and a movie service gadget 312, and performs the gadget network based-service.

For example, "silver care service", which is the private service, is provided to the user through the private gadget network formed by the private gadgets 301, 302, and 303. The silver care service includes a medical management service based on old-age cardiac information, a road guide service based on GPS information, and a life log based on user information.

The user owes and moves the private gadgets 301, 302, and 303. The private gadgets 301, 302, and 303 form a private gadget network according to a general communication protocol. The private gadgets 301, 302, and 303 cooperate according to a silver care service application loaded in the private gadgets 301, 302, and 303 and perform the gadget network based-service. The private gadgets 301, 302, and 303 manufacture information collected from the user into context awareness information, and performs a specific gadget network based-service by own determination or by cooperation with the public gadgets 311 and 312 related to a corresponding service.

To be specific, the cardiac sensor gadget 301 forms a public gadget network with the external cooperation gadget 311 and cooperates with an external network such that medical management service based on the cardiac information provided by a corresponding gadget service server (not shown in FIG. 3) can be provided to the user. Also, the GPS gadget 303 forms a public gadget network with the external cooperation gadget 311 and cooperates with an external network such that a road guidance service based on the GPS information provided from a corresponding gadget service server (not shown in FIG. 3) is provided to the user. Also, the user interface gadget 302 forms the private gadget network, but performs a personal life log through cooperation between more than one gadgets. Accordingly, the user interface gadget 302 can provide a memory improving service for providing the personal life log to the user.

A case that the user moves to a place around a movie service gadget 312 will be described hereinafter.

The private gadget including the cardiac sensor gadget 301, the user interface gadget 302, and the GPS gadget 303 maintains or reforms the formed gadget network. The user interface gadget 302 provides a theater service, i.e., a movie watching service, provided by the movie service gadget 312 to the user by cooperating with the movie service gadget 312.

Figure 4:
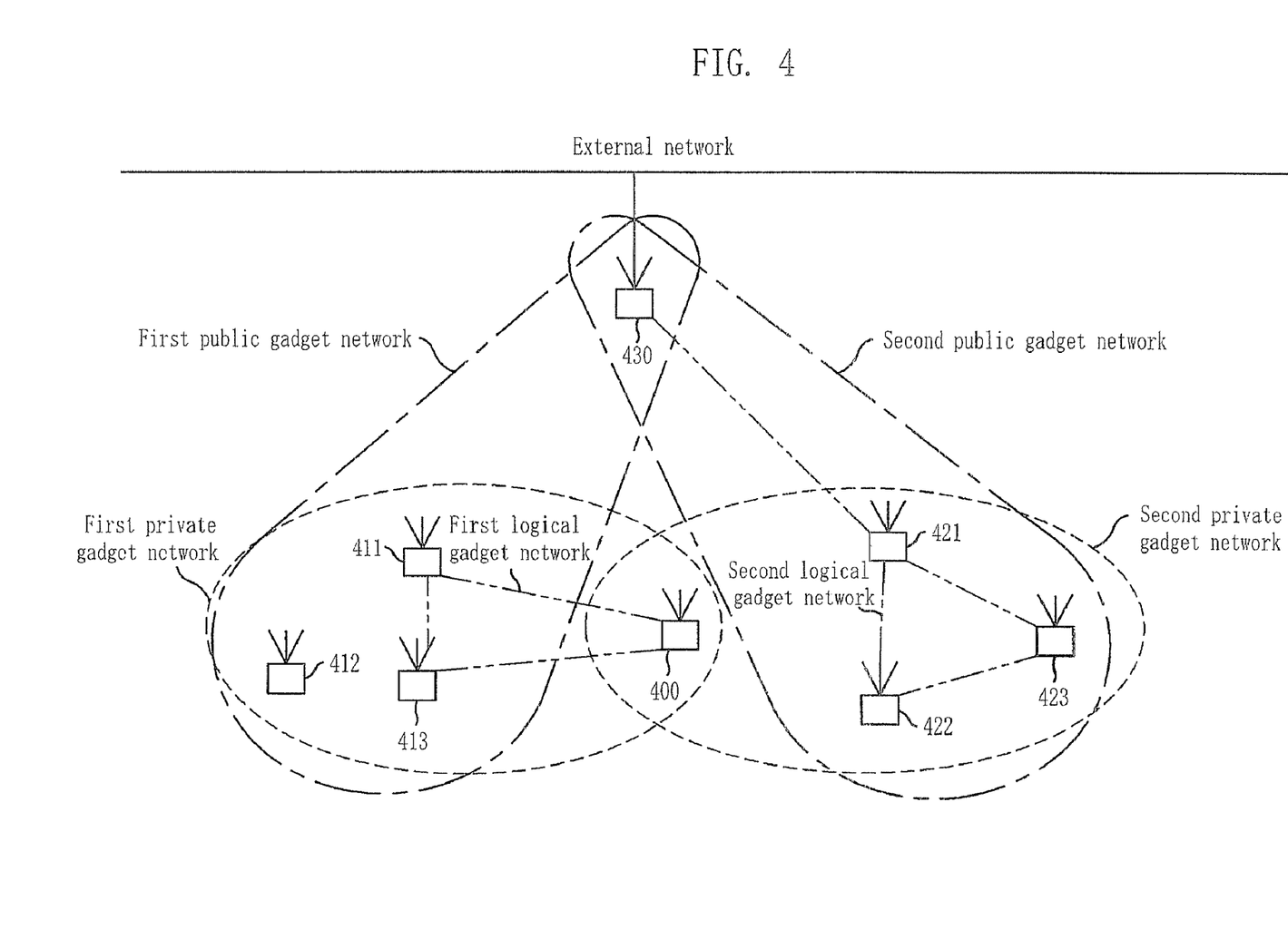
FIG. 4 shows a logical gadget network formed in the intelligent gadget network to which the present invention is applied.

FIG. 4 shows a logical gadget network formed in the intelligent gadget network to which the present invention is applied.

Referring to FIG. 4, the gadget network includes a first private gadget network, a second private gadget network, a first public gadget network and a second public gadget network.

The first and second private gadget networks include only private gadgets 411 to 413, and 421 to 423 where a network ID included in the gadget network is pre-set up. The first and second public gadget networks include a public gadget 430 where a network ID included in the gadget network is not set up.

FIG. 4 will be described under assumption that the first and second private gadget networks are close to each other and have the same physical communication channel and network ID. The private gadgets 411, 412, and 413 within the first private gadget network pre-form the gadget network. The private gadgets 421, 422, and 423 within the second private gadget network pre-form the gadget network. A private gadget 400 is user's gadget in the first private gadget network.

When the private gadget 400 starts in an initial operation state, the private gadget 400 determines that the network ID designated to the searched two neighboring private gadget networks, i.e., the first and second private gadget networks, is the same as own network ID.

The private gadget 400 determines a communication state and tries to join the gadget network showing an optimal communication environment. The private gadget 400 uses a signal strength, a link quality, and a Packet Error Rate (PER) to determine a communication state with the first and second private gadget networks. When the private gadget 400 determines that the second private gadget network is a gadget network showing an optimal communication environment, the private gadget 400 tries to join the second private gadget network.

The private gadget 400 performs a user authentication procedure with the second private gadget network. When the private gadget 400 determines through the user authentication procedure that a user is different from the user of the second private gadget network, the private gadget 400 fails to join the second private gadget network.

When the private gadget 400 fails to join the second private gadget network, the private gadget 400 joins the first private gadget network having the same network ID. That is, the private gadget 400 joins the first private gadget network according to the network joining procedure described above.

When there is the neighboring public gadget 430 after formation of the first and second private gadget networks, the first and second public gadget networks includes the public gadget 430 and formed doubly with the first and second private gadget networks.

The gadgets within the first and second public gadget networks, i.e., the private and public gadgets, exchange the gadget service control information among gadgets in a procedure of performing the gadget network based-service. In the private and public gadgets, only gadgets attending the specific gadget network based-service based on the exchanged gadget service control information. The gadget network based-service is performed based on the logical gadget network formed described above.

Referring to FIG. 4, the first logical gadget network in the first public gadget network including the first private gadget network includes the private gadgets 400, 411, and 413. Also, the second logical gadget network in the second public gadget network including the second private gadget network includes private gadgets 421, 422, and 423, and a public gadget 430.

Figure 5:
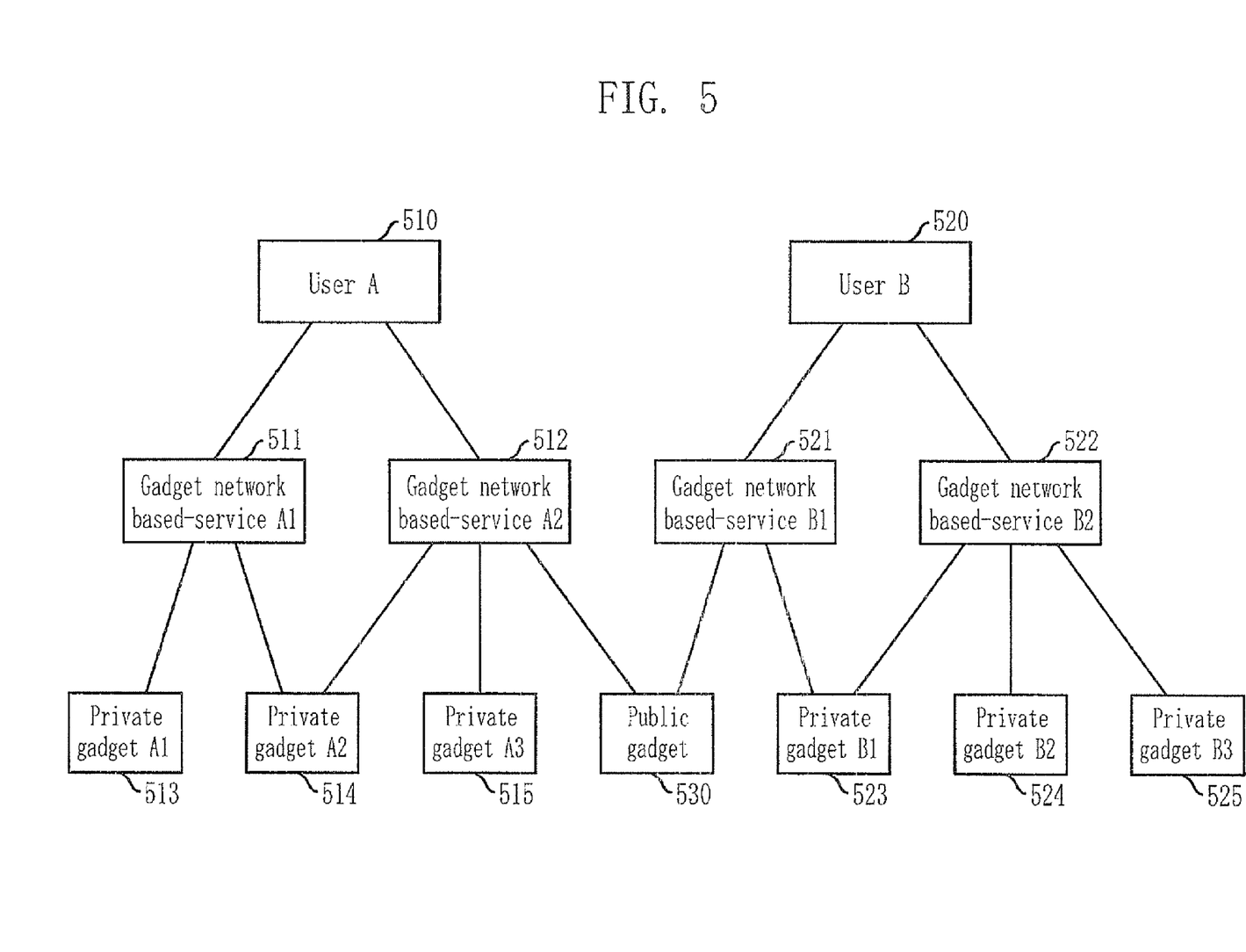
FIG. 5 shows relationship of users, gadgets, and gadget services in the intelligent gadget network to which the present invention is applied.

FIG. 5 shows relationship of users, gadgets, and gadget services in the intelligent gadget network to which the present invention is applied.

Referring to FIG. 5, a user A 510 includes a private gadget A1 513, a private gadget A2 514, and a private gadget A3 515. Also, a user B 520 includes a private gadget B1 523, a private gadget B2 524, and a private gadget B3 525. A public gadget 530 is not included in a specific user in providing a service.

The gadget network based-service provided to the user A 510 including a gadget network based-service A1 511 and a gadget network based-service A2 512 is performed through interaction of more than one gadget. To be specific, the gadget network based-service A1 511 is performed through interaction of the private gadget A1 513 and the private gadget A2 514. The gadget network based-service A2 512 is performed through interaction of the private gadget A2 514, the private gadget A3 515, and the public gadget 530.

The gadget network based-service provided to a user B 520 including a gadget network based-service B1 521 and a gadget network based-service B2 522 is performed through interaction of more than one gadget. To be specific, the gadget network based-service B1 521 is performed through interaction of the public gadget 530 and the private gadget B1 513. The gadget network based-service B2 522 is performed through interaction of the private gadget B1 523, the private gadget A2 524, and the private gadget A3 525.

In particular, specific gadgets including the private gadget A2 514, the public gadget 530, and the private gadget B1 523 may be simultaneously operated to provide more than one gadget network based-service. Also, the specific services including the gadget network based-service A2 512, and the gadget network based-service B1 521 are performed by cooperation of the private gadgets 514, 515, and 523, and the public gadget 530.

Figure 6:
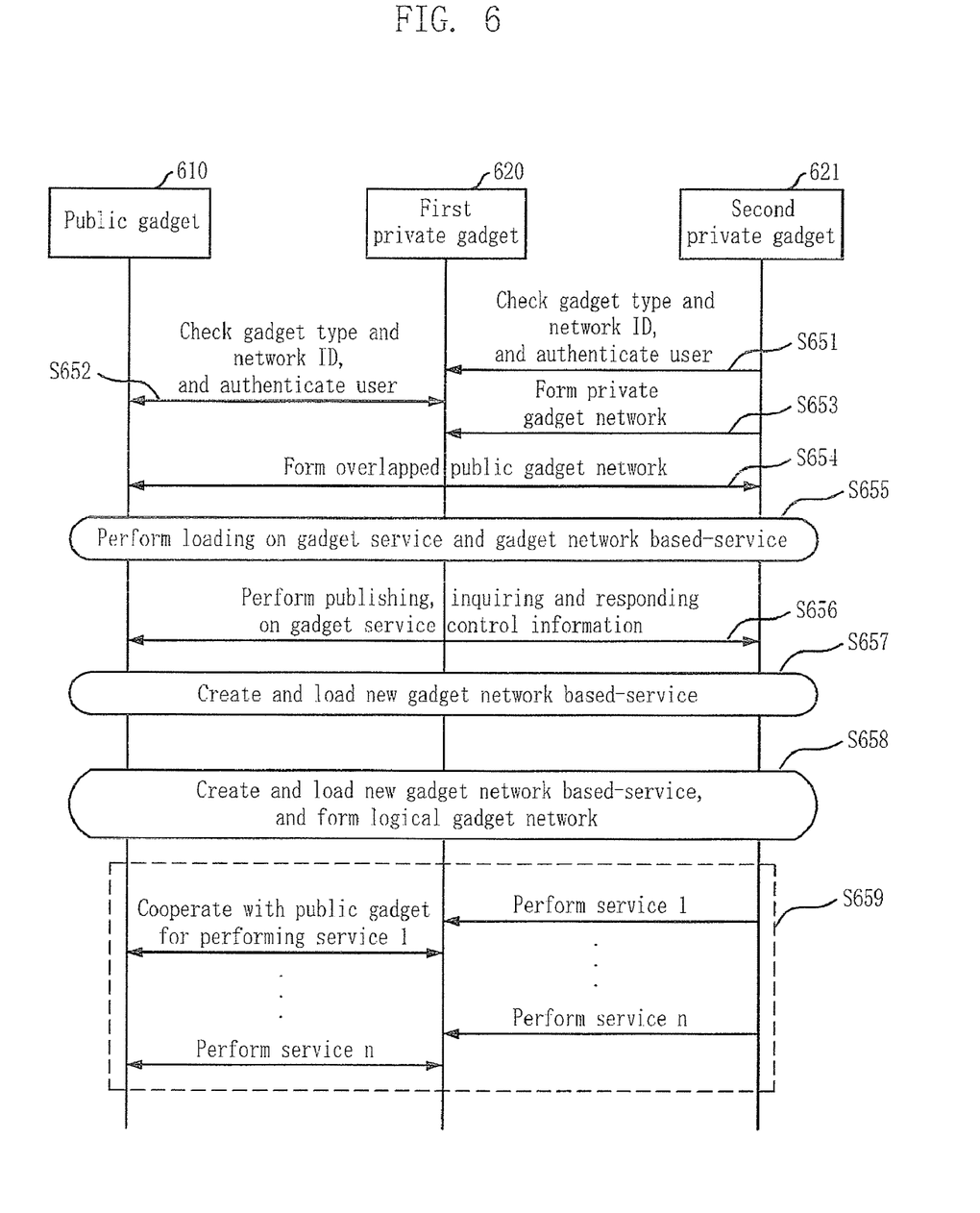
FIG. 6 is a flowchart describing a method for providing a personalization service in a ubiquitous environment in accordance with an embodiment of the present invention.

FIG. 6 is a flowchart describing a method for providing a personalization service in a ubiquitous environment in accordance with an embodiment of the present invention.

Referring to FIG. 6, the first private gadget 620 checks information such as a gadget type of neighboring gadgets including a public gadget 610 and a second private gadget 621, and a network ID, and authenticates the user at steps S651 and S652.

The first private gadget 620 and the second private gadget 621 form a private gadget network at step S653. When the first private gadget 620 and the second private gadget 621 form the private gadget network, a public gadget network, which includes the public gadget 610 and is overlapped with the private gadget network, is formed at step S654.

The first private gadget 620 starts the gadget service, which is a unique function of the first private gadget 620, and performs loading on the pre-set up gadget network based-service at step S655. The first private gadget 620 performs publishing, inquiring and responding on the gadget service control information for exchanging gadget service control information among gadgets in the gadget network at step S656.

The first private gadget 620 creates and loads a new gadget network based-service based on the gadget service control information exchanged between the gadgets at step S657, or forms a logical gadget network including only gadgets attending the performance of the gadget network based-service at step S658. When a new gadget network based-service is created based on the gadget service control information exchanged between gadgets, the first private gadget 620 creates a service based on the context awareness information or creates the service upon request of the user at step S659.

For example, the user interface function is not provided to the first private gadget 620. When the public gadget 610 for providing a display function is detected, it will be performed as follows.

A gadget network based-service for helping that the first private gadget 620 uses the display function provided from the public gadget 610 is actively created. The gadget network based-service is performed through interaction of gadgets based on a logical gadget network.

The present invention can build a ubiquitous environment and ceaselessly provide a personalization service in a built ubiquitous environment.

Since the present invention is managed by being divided into a private gadget network and a public gadget network, a network can be easily extended.

Also, since the gadget is not exposed to an external network in the private gadget network, the present invention can easily maintain security.

The present invention can easily apply own gadget service between gadget network members in another gadget.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. An intelligent gadget for providing a personalization service in a ubiquitous environment, comprising:
   a gadget service unit for collecting and processing data to provide a personalization service; and
   a gadget interface unit for forming a gadget network between gadgets and providing a cooperating service based on the collected and processed data,
   wherein the gadget interface unit includes:
   a gadget network interface for forming a gadget network with a gadget network member;
   a gadget network determining unit for determining formation of a gadget network with respect to the gadget network member based on a gadget identification (ID) and a gadget network ID; and
   a gadget controlling unit for creating a gadget network based-service based on the processed data between the determined gadget network members, and
   wherein the gadget network determining unit determines according to the network ID of a neighboring gadget whether the gadget network to be included is a designated private gadget or a public gadget where the gadget network to be included is not designated.

2. The intelligent gadget of claim 1, wherein the gadget service unit provides the personalization service cooperating with an external network.

3. The intelligent gadget of claim 1, wherein the gadget network determining unit forms a network having the private gadget authenticated based on the gadget ID as a member.

4. The intelligent gadget of claim 1, wherein the gadget network determining unit forms a network having the private gadget authenticated based on the gadget ID as a member and including the public gadget.

5. The intelligent gadget of claim 1, wherein the gadget controlling unit performs publishing, inquiring and responding on gadget service control information such that the gadget service provided by the gadget controlling unit can be provided to the gadget network members.

6. The intelligent gadget of claim 1, wherein the gadget controlling unit controls the gadget network member based on provided gadget service information and gadget service control information.

7. The intelligent gadget of claim 6, wherein the gadget controlling unit determines a gadget attending a specific gadget network based-service based on the gadget service control information exchanged by the gadget network member and forms a logical gadget network with only the gadgets attending the specific gadget network based-service.

8. A method for providing a personalization service by a gadget in a ubiquitous environment, comprising the steps of:
   a) when a gadget network is formed based on gadget identification (ID) and network ID of neighboring gadgets, starting a gadget service from the formed gadget network, exchanging gadget service control information with the neighboring gadgets, and loading a gadget network based-service;
   b) creating a new gadget network based-service based on the gadget service control information exchanged with the neighboring gadgets;
   c) forming a logical gadget network including only gadgets attending performance of the gadget network based-service when the created gadget network based-service is created; and
   d) performing a gadget network based-service through interaction of gadgets based on the logical gadget network.

9. The method of claim 8, wherein the step a) includes the step of:
   a1) forming a network with gadgets designated according to the network ID.

10. The method of claim 8, wherein the step a) includes the step of:
   a2) forming the network with the gadgets designated according to the network ID and forming a network with gadgets which are not designated to the formed network.

11. The method of claim 8, wherein the step c) includes the steps of:
   e) when first and second gadget networks are overlapped, determining whether the network ID designated to the first and second gadget networks is same;
   f) when the network ID is same, determining a communication state with the first or second gadget network and trying to joining the gadget networks;
   g) when it is determined that an optimal communication state gadget network is the first gadget network, trying to join the first gadget network and performing a user authentication procedure;
   h) when it is determined that the first gadget network is a network of another user, trying to join the second gadget network and performing the user authentication procedure; and
   i) when it is determined that the second gadget network is the user's network, joining the second gadget network.

12. The method of claim 11, wherein in the step f), a communication state with the first or second gadget network is determined based on a signal strength, link quality and Packet Error Rate (PER).

13. The method of claim 8, wherein in the step a), the gadget service control information is exchanged with the gadget network members by performing publishing, inquiring and responding.

* * * * *